May 30, 1933.    L. J. BLACK    1,911,670
SELF ALIGNING POLISH ROD STUFFING BOX
Filed May 3, 1932    2 Sheets-Sheet 1
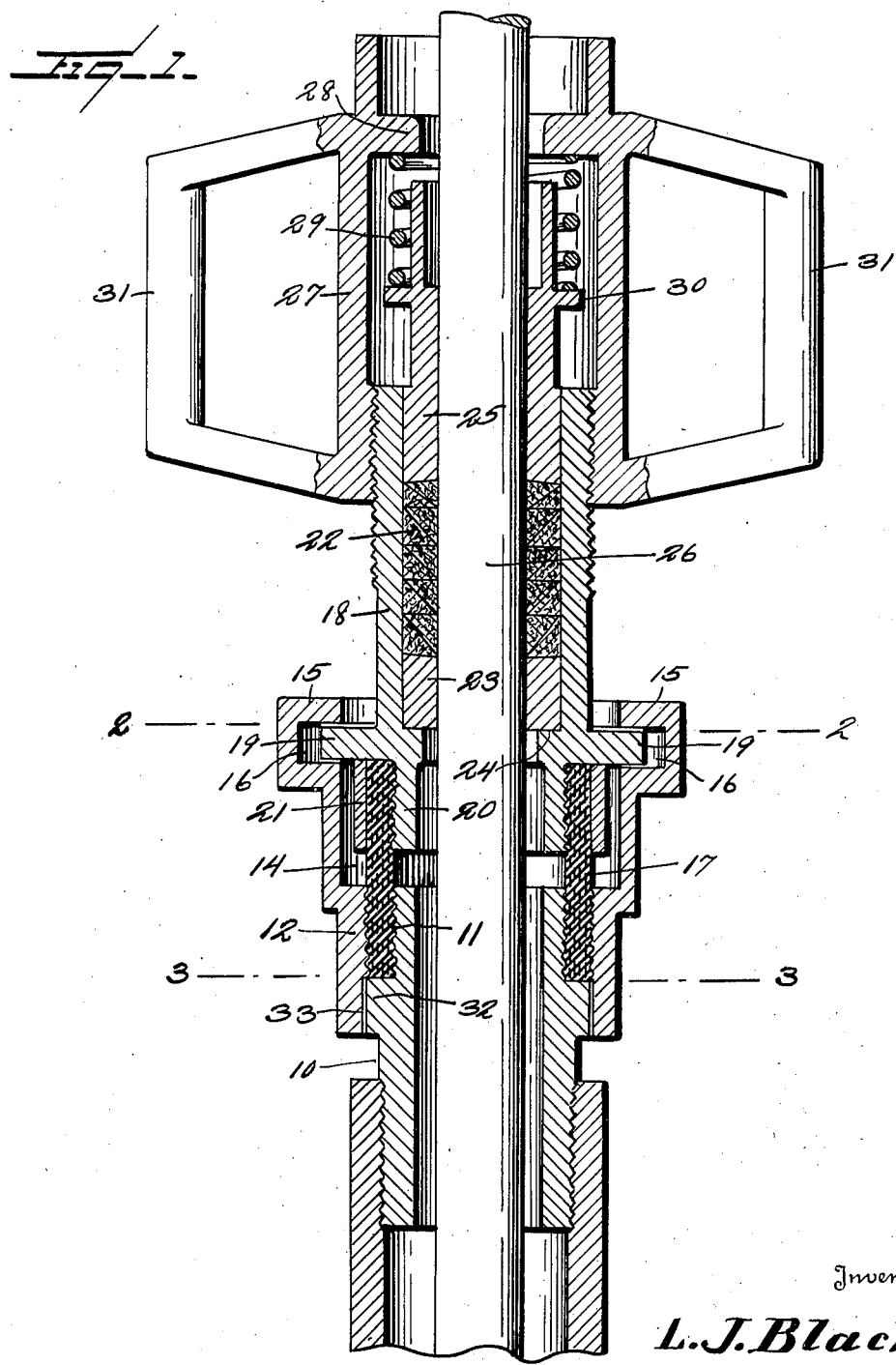
Inventor
L. J. Black

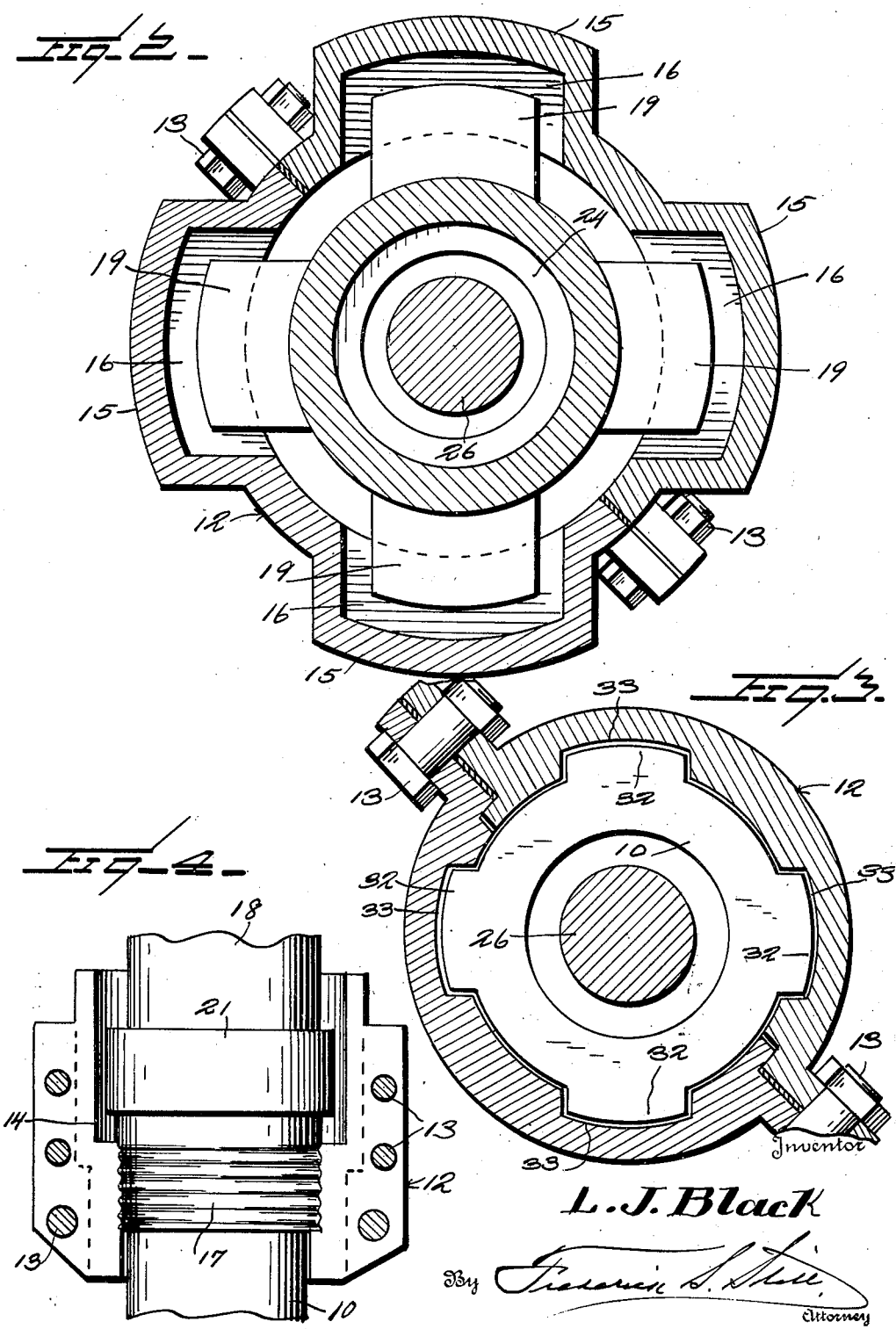

Patented May 30, 1933

1,911,670

UNITED STATES PATENT OFFICE

LEE J. BLACK, OF BEAUMONT, TEXAS

SELF-ALIGNING POLISH ROD STUFFING BOX

Application filed May 3, 1932. Serial No. 608,953.

This invention relates to stuffing boxes used in connection with the pumping mechanism of oil wells or in other situations wherein a polish rod or its equivalent reciprocates through a stuffing box, the polish rod being operated by means of a walking beam. When the polish rod is connected to a walking beam for reciprocation, it is impossible to secure a true vertical traverse of the polish rod through the stuffing box. Many efforts have been made to secure a true vertical movement of the polish rod but none have been entirely successful. The result is that the side thrust of the polish rod in its upward and downward movement cuts out the packing in the stuffing box, causing leakage and waste of oil if not given constant attention.

The general object of the present invention is to provide means used in connection with a stuffing box which will permit the stuffing box to shift in two or more directions and thus align with the rod in its reciprocation.

A further object is to provide an attachment of this character which may be used in connection with any standard stuffing box and pumping equipment.

A still further object is to provide a structure of this character in which the torsional strain and either pulling or thrust strains on the flexible element connecting the stuffing box with the tubing of the well are entirely eliminated, thus providing for a relatively long use of the flexible element.

Another object is to provide a construction of this character such that the stuffing box may swing in a plurality of directions at angles to each other.

Other objects will appear in the course of the following description.

My invention is illustrated in the accompanying drawings, wherein:—

Figure 1 is a vertical sectional view of the stuffing box with my invention applied thereto;

Figure 2 is a section on the line 2—2 of Figure 1;

Figure 3 is a section on the line 3—3 of Figure 1;

Figure 4 is a fragmentary elevation showing one half section of the collar with the flexible element and the clamping ring thereof.

Referring to these drawings, 10 designates the top of the usual well tubing. The upper end of the tubing section 10 is reduced upon its exterior diameter as at 11, the face of this reduced portion being preferably roughened, knurled, or threaded.

Disposed to clamp upon the upper portion of the section 10 is a split gland or collar designated generally 12. This, as illustrated, is made in two halves connected by bolts 13. The lower end of this collar or gland is reduced in diameter to fit upon and clamp on the upper portion of the pipe section 10. Above the upper end of the pipe section 10, the gland or collar is increased in internal diameter at 14 and above this portion 14, the gland is formed with a plurality of outwardly extending wings 15 shown as four in number, these wings being formed with radially extending recesses 16. Disposed between the lower portion of the gland and the face 11 of the upper end of the pipe section 10 is a flexible, annular section 17 which may be made of leather, rubber or any other sufficiently flexible but oil-proof material. Extending downward into the upper end of the collar is a stuffing box section 18. The lower end of this section has a plurality of outwardly extending flanges 19 which operate loosely within the recesses 16. Below the flanges 19, the stuffing box section 18 extends downward as at 20 to receive against it the upper end of the annular flexible element 17, the upper end of this flexible element being clamped against the portion 20 by means of the clamping ring or collar 21. The face of the section 20 is knurled, roughened or threaded in the same manner as the face 11 for the purpose of securing a firm oil-tight engagement between the flexible element 17 and the stuffing box section 18 on the one hand and the pipe 11 on the other hand.

The enlarged portion 14 of the collar 12 has an internal diameter such that the upper end of the flexible element with the lower end of the stuffing box section 18 and with the clamping collar 21 has a certain freedom of movement outward. The section 18 is recessed upon its inner face for the purpose of carrying the packing elements 22 and the rings 23 upon which the packing elements 22 are supported, these rings resting upon a shoulder 24 constituting the lower wall of this recessed portion.

Operating through the upper end of the stuffing box section 18 is an annular gland 25 which bears upon the packing. A polish rod which operates through the stuffing box is designated 26 and this extends through the gland 25. Having screw-threaded engagement with the upper end of the stuffing box section 18 is the upper stuffing box section 27 which is of standard construction and has the usual inwardly extending annular flange 28 against which the upper end of a coiled spring 29 bears, this coiled spring surrounding the upper portion of the gland 25 and bearing against a flange 30 on this gland. Thus the gland 25 is forced downward against the packing 22 by the action of the spring 29. The stuffing box section 27 is provided with the laterally projecting handles 31 whereby the stuffing box section may be rotated to screw it on or screw it off of the section 18 and to increase or decrease the pressure of the spring 29. It is to be understood that while I have illustrated one particular form of stuffing box, I do not wish to be limited thereto as other forms of standard stuffing box might be used in connection with the stuffing box element 18. The stuffing box element 18 is also old except insofar as it is modified to provide the radially projecting flanges 19 engaging in the recesses 16.

Preferably, though I do not wish to be limited to this, the upper end of the pipe section 10 is formed with the outwardly projecting lugs 32 and the lower end of the collar or gland 12 is formed as illustrated in Figure 3 with recesses 33 to receive these lugs 32 so that the collar is held from any rotative movement relative to the tubing section 10. It will be seen that the stuffing box section 18 is also held from any but a limited rotation or oscillation with relation to the collar or gland 12. If instead, the collar 12 was provided at its upper end with a single annular recess 16 and the flange 19 was an annular flange instead of being formed by a plurality of flanges, there might, under some circumstances, be such a torsional strain applied to the flexible element 17 as would tend to damage it, either by tearing it apart or by constant wear. By providing, however, a plurality of flanges 19 fitting quite loosely within a plurality of recesses 16 formed in the upper end of the collar, only a limited rotative movement can be given to the stuffing box section 18 and thus this torsional stress upon the flexible element 17 is entirely eliminated.

It will be seen that I have provided a stuffing box construction which permits of a movement of the stuffing box with the polish rod while at the same time a fluid-tight engagement is provided between the stuffing box and the tubing of the well. It will further be seen that I have provided means for preventing any strains of any abnormal character coming upon the flexible element 17.

Thus no longitudinal pulling strains can come upon this flexible element for the reason that the flanges 19 fit within the recesses 16 and these recesses 16 and the collar prevent the stuffing box element 18 from moving downward and upward. This also prevents any compression strains upon the flexible element 17 and torsional strains, as before stated, are eliminated by the interlocking engagement between the lower end of the collar or gland 12 and the upper end of the tubing section 10 and the interlocking engagement between the stuffing box section 18 and the upper end of the collar or gland 12. With this construction, the stuffing box will follow the motions of the polish rod and as a consequence, this will eliminate excessive wear usually found in the stuffing boxes of polish rods or equivalent structures.

While I have illustrated a construction which has been found to be very practical and which is really extremely simple, I do not wish to be limited to the particular details of the construction particularly as regards the details of the stuffing box as these might be modified in many ways and the principle of my invention may be applied to any standard form of stuffing box such as are used for packing the polish rods of well pumps.

Neither do I wish to be limited to the use of this device as a packing means for oil well pumps as it is obvious that the same principle as might be applied in any situation where it is desirable to provide for a lateral movement of the stuffing box in accordance with the lateral movement of any polish or pump rod or equivalent part and where it is desired to secure a fluid-tight engagement between the packing and the rod reciprocating therethrough.

I claim:—

1. A self-aligning stuffing box for piston rods, including a base member, a flexible member annular in cross section, a stuffing box element, clamping means also engaging the stuffing box element and anchoring the flexible member to the base member, said clamping means limiting the vertical, horizontal, lateral and rotative movement between the stuffing box and the flexible member, 2. In a self-aligning stuffing box for piston rods, including a well tubing, a flexible tube having fluid-tight engagement with the upper end of the well-tubing, a stuffing box element, and clamping means anchoring the flexible tubing to the stuffing box element, and clamping means carried by the well tubing and engaging the stuffing box element and anchoring the flexible tubing to the well tubing and preventing vertical movement and limiting horizontal, lateral and rotative movement of the stuffing box element.

3. In a mechanism of the character described, the combination with a well tubing and a piston rod reciprocating therethrough, of a stuffing box through which the rod passes, a flexible tubing attached to the well tubing at its lower end and attached to the stuffing box at its upper end whereby the stuffing box may bodily move laterally to align with the piston rod as it reciprocates, and an element carried by the well tubing with which the stuffing box has a limited laterally movable connection, said element preventing movement of the stuffing box in a vertical plane and limiting the rotational movement of the stuffing box.

4. The combination with a pump tubing and a piston rod reciprocating therethrough, of a stuffing box through which the rod reciprocates, a flexible tubing attached at its upper end to the stuffing box, and a member clamping the flexible tubing upon the upper end of the well tubing, said clamping member having a horizontally disposed recess, and a stuffing box having a lug extending into said recess, the walls of said recess limiting the rotational movement of the lug and the vertical movement thereof.

5. In a self-aligning stuffing box for piston rods, a tubular base member, a flexible tube attached at its lower end to the base member, a stuffing box element with which the upper end of said flexible tube is engaged, the stuffing box element having radially and outwardly extending lugs, and a collar clamping the flexible tube upon the tubular base, the collar at its upper end having a series of radial recesses disposed in a horizontal plane into which the radial lugs extend, the walls of said recesses limiting the rotational movement of the stuffing box element with relation to the tubular base, limiting radial movement of the stuffing box element, and preventing vertical movement of the stuffing box element with relation to the collar.

6. In a self-aligning stuffing box for piston rods, a tubular base member, a flexible tube, a stuffing box element to which the upper end of the flexible tube is engaged, the stuffing box element having radially extending lugs, a collar embracing the upper end of the tubular base and clamping the flexible tube upon the base, said collar extending upward to a point above the lower end of the stuffing box element and being there provided with a plurality of radially extending recesses disposed in a horizontal plane receiving the lugs on the stuffing box element, the walls of said recesses permitting limited lateral movement of the stuffing box element and limited rotational movement thereof but the walls thereof preventing vertical movement of the stuffing box element relative to the collar.

7. In a mechanism of the character described, the combination with a pump tubing and a pump rod reciprocating therethrough, of a stuffing box through which the rod passes, a flexible tube attached at its upper end to the stuffing box, and a member clamping the lower end of the flexible tubing upon the upper end of the well tubing, said member having a plurality of radially extending recesses extending in different directions and the stuffing box being provided with a plurality of lugs engaging said recesses, the walls of the recesses limiting the movement of the lugs in radial directions and limiting their rotational movement and holding said lugs from upward movement relative to the flexible tubing.

8. In a self-aligning stuffing box for piston rods, a tubular base member, a flexible tube, a stuffing box element to which the upper end of the flexible tube is engaged, the stuffing box element having radially extending lugs, a collar embracing the upper end of the tubular base and clamping the flexible tube upon the base, said collar extending upward to a point above the lower end of the stuffing box element and being there provided with a plurality of radially extending recesses receiving the lugs on the stuffing box element, the walls of said recesses permitting limited lateral movement of the stuffing box element and limited rotational movement thereof but preventing vertical movement of the stuffing box element relative to the collar, the collar being engaged with the tubular base against relative rotation.

9. In a self-aligning stuffing box for piston rods, a tubular base member reduced at its upper end, a flexible tube surrounding the reduced end and extending above the same, a stuffing box element with which the upper end of the flexible tube is engaged, means clamping the upper end of the flexible tube to the stuffing box element, the stuffing box element being provided with a plurality of radially extending lugs, the adjacent lugs being disposed at right angles to each other, a collar bearing against the lower end of the flexible tube and having non-rotative engagement with the upper end of the tubular base, said collar extending above the lower end of the stuffing box element, and being formed to provide a chamber slightly larger in diameter than the diameter of the flexible element at its upper end, and anchoring means therefor to permit lateral movement of the upper end of the flexible tube, the upper end of the collar being formed with a plurality of recesses to receive the lugs on the stuffing box element, said recesses being wider and deeper than the lugs whereby to permit limited lateral movement and circumferential movement of the stuffing box element and to prevent vertical movement of the stuffing box element relative to the base tubing.

10. In a well pumping mechanism, a well tubing section reduced in exterior diameter at its upper end, a flexible tubing section having its lower end disposed against said reduced upper end of the well tubing, a stuffing box including a lower stuffing box element having a downwardly extending flange against the exterior of which the flexible tubing bears, a ring clamping the upper end of the flexible tubing against said flange, the stuffing box element above said ring being formed with a plurality of radially extending lugs, packing disposed within the stuffing box element and bearing against said rod, a gland bearing against the packing, resilient means urging said gland inward, and a two-part collar surrounding the lower portion of the flexible tube and clamping it to the well tubing, said collar being enlarged above the upper end of the well tubing to permit limited lateral movement of the flexible tubing and being formed at its upper end with a plurality of radially extending recesses to receive the lugs on the stuffing box element, said recesses being wider than and deeper than the lugs to permit limited radial movement of the lugs and limited rotative movement thereof, said recesses preventing vertical movement of the lugs with relation to the collar, the collar at its lower end having means engaging the upper end of the well tubing to prevent rotative movement of the collar.

11. In a mechanism of the character described, a well tubing, a piston rod reciprocating therethrough and having movement in a horizontal plane as it reciprocates, a stuffing box through which the rod passes, means flexible in all directions affording a liquid-tight joint between the well tubing and the stuffing box and permitting the stuffing box to move radially with relation to the axial center of the well tubing, and means providing for limited bodily movement of the stuffing box in directions radial to the axial center of the well tubing, said means limiting rotative movement of the flexible means and of the stuffing box, and preventing upward movement of the stuffing box with relation to the well tubing.

12. The combination of a well tube, a piston rod reciprocating therethrough, the piston rod having movement radial to the axial center of the well tubing, of a stuffing box through which the rod passes, a flexible tubing attached to the upper end of the well tubing and at its upper end attached to the stuffing box whereby the stuffing box may shift freely in directions radial to the axial center of the well tubing, and means carried by the well tubing providing for a limited bodily movement of the stuffing box radial to the axial center of the well tubing but limiting rotative movement of the stuffing box and limiting vertical movement of the stuffing box relative to the well tubing to thereby prevent the flexible tubing from being subjected to torsional strains or tensional strains.

In testimony whereof I affix my signature.
LEE J. BLACK.